US011999033B2

(12) United States Patent
Heimann

(10) Patent No.: US 11,999,033 B2
(45) Date of Patent: Jun. 4, 2024

(54) DRAIN CLEANER CABLE DECOUPLER TOOL

(71) Applicant: MILWAUKEE ELECTRIC TOOL CORPORATION, Brookfield, WI (US)

(72) Inventor: Joshua P. Heimann, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 680 days.

(21) Appl. No.: 17/054,346

(22) PCT Filed: Oct. 5, 2020

(86) PCT No.: PCT/US2020/054241

§ 371 (c)(1),
(2) Date: Nov. 10, 2020

(87) PCT Pub. No.: WO2021/067926

PCT Pub. Date: Apr. 8, 2021

(65) Prior Publication Data

US 2022/0298775 A1 Sep. 22, 2022

Related U.S. Application Data

(60) Provisional application No. 62/909,876, filed on Oct. 3, 2019.

(51) Int. Cl.
*B25B 27/00* (2006.01)
*B25B 27/02* (2006.01)
(Continued)

(52) U.S. Cl.
CPC .............. *B25B 27/02* (2013.01); *B25B 27/10* (2013.01); *B25B 27/14* (2013.01); *E03F 9/005* (2013.01)

(58) Field of Classification Search
CPC ......... B25B 27/00; B25B 27/02; B25B 27/14; B25B 27/10
See application file for complete search history.

(56) References Cited

U.S. PATENT DOCUMENTS 2,266,659 A 12/1941 Robinson et al.
2,628,380 A 2/1953 Therrien
(Continued)

FOREIGN PATENT DOCUMENTS

CN 2179795 Y 10/1994
CN 1300897 A 6/2001
(Continued)

OTHER PUBLICATIONS

International Search Report and Written Opinion for Application No. PCT/US2020/054241 dated Jan. 20, 2021 (8 pages).
(Continued)

*Primary Examiner* — Lee D Wilson
(74) *Attorney, Agent, or Firm* — Michael Best & Friedrich LLP

(57) ABSTRACT

A cable decoupler tool configured to uncouple a drain cleaner cable coupling. The cable decoupler tool includes a mouth configured to receive a circumferential portion of a cable, a pin key extending from the mouth, and an actuator movable relative to the mouth to uncouple the drain cleaner cable coupling.

16 Claims, 10 Drawing Sheets

(51) Int. Cl.

| | |
|---|---|
| ***B25B 27/10*** | (2006.01) |
| ***B25B 27/14*** | (2006.01) |
| ***E03F 9/00*** | (2006.01) |

(56) References Cited

U.S. PATENT DOCUMENTS

| | | | | |
|---|---|---|---|---|
| 2,705,642 | A | 4/1955 | Chasar | |
| 2,955,307 | A | 10/1960 | Hunt | |
| 3,075,218 | A | 1/1963 | Kollmann | |
| 3,213,473 | A | 10/1965 | Singer | |
| 4,361,924 | A | 12/1982 | Irwin | |
| 4,447,926 | A | 5/1984 | Rothenberger | |
| 4,556,352 | A | 12/1985 | Resnicow | |
| 4,763,374 | A | 8/1988 | Kaye | |
| 5,414,888 | A | 5/1995 | Irwin | |
| 5,603,136 | A | 2/1997 | Truschler | |
| 5,649,613 | A | 7/1997 | Truschler | |
| 5,657,505 | A | 8/1997 | Gallagher et al. | |
| 5,909,911 | A * | 6/1999 | Long | B25B 27/023 29/259 |
| 6,076,219 | A | 6/2000 | Irwin | |
| 6,240,614 | B1 | 6/2001 | Kojima et al. | |
| 6,546,582 | B2 | 4/2003 | Silverman | |
| 6,655,228 | B1 | 12/2003 | Margherio et al. | |
| 6,742,415 | B2 * | 6/2004 | Scott | E05B 79/20 269/6 |
| 8,087,138 | B2 * | 1/2012 | Gupta | B25B 27/146 29/268 |
| 8,169,170 | B2 | 5/2012 | Yasohara et al. | |
| 8,413,347 | B2 | 4/2013 | Gress et al. | |
| 8,696,286 | B1 * | 4/2014 | Martin | B60B 29/00 269/95 |
| 9,021,673 | B2 | 5/2015 | Ray | |
| 9,157,320 | B2 * | 10/2015 | Lehnert | B25B 27/023 |
| 10,166,665 | B2 | 1/2019 | Szymusiak et al. | |
| 10,272,480 | B2 | 4/2019 | Zink et al. | |
| 10,889,976 | B2 | 1/2021 | Skrjanc et al. | |
| 2009/0211044 | A1 | 8/2009 | Hale et al. | |
| 2009/0235510 | A1 | 9/2009 | Gupta | |
| 2013/0319190 | A1 | 12/2013 | Nino et al. | |
| 2014/0106889 | A1 | 4/2014 | Cheng | |
| 2015/0105163 | A1 | 4/2015 | Rutkowski et al. | |
| 2015/0150635 | A1 | 6/2015 | Kilroy et al. | |
| 2015/0321326 | A1 | 11/2015 | Nino et al. | |
| 2016/0245441 | A1 | 8/2016 | Klein et al. | |
| 2018/0030714 | A1 | 2/2018 | Miller et al. | |
| 2018/0030715 | A1 | 2/2018 | Miller et al. | |
| 2018/0147713 | A1 | 5/2018 | Schmauder et al. | |
| 2019/0162558 | A1 | 5/2019 | Schmauder et al. | |
| 2019/0186551 | A1 | 6/2019 | Skrjanc et al. | |
| 2019/0210077 | A1 | 7/2019 | Zink et al. | |
| 2020/0048885 | A1 | 2/2020 | Reed et al. | |
| 2020/0230789 | A1 | 7/2020 | Dey, IV et al. | |
| 2021/0229140 | A1 | 7/2021 | Rose et al. | |
| 2021/0245208 | A1 | 8/2021 | Reed et al. | |

FOREIGN PATENT DOCUMENTS

| | | | |
|---|---|---|---|
| CN | 201052511 | Y | 4/2008 |
| CN | 201109080 | | 9/2008 |
| CN | 101941188 | | 1/2011 |
| CN | 102036759 | A | 4/2011 |
| CN | 203222865 | U | 10/2013 |
| CN | 106903122 | A | 6/2017 |
| DE | 1935805 | U | 3/1966 |
| DE | 1942341 | C3 | 9/1979 |
| DE | 2613944 | C3 | 7/1981 |
| DE | 19739359 | A1 | 5/1999 |
| DE | 102007027046 | A1 | 12/2008 |
| DE | 102017109923 | A1 | 11/2018 |
| EP | 0607612 | B1 | 3/1997 |
| EP | 3476498 | A1 | 5/2019 |
| JP | 2000042506 | A | 2/2000 |
| KR | 100528285 | | 11/2005 |
| KR | 1020150115509 | A | 10/2015 |
| KR | 1020160143309 | A | 12/2016 |
| RU | 59453 | U1 | 12/2006 |
| WO | 03010367 | | 2/2003 |
| WO | 2020215059 | A1 | 10/2020 |

OTHER PUBLICATIONS

Ridgid Tools, "Ridgid K-60 Sectional Drain Cleaner," <https://www.youtube.com/watch?v =-_HsRvo1zW8> video publicly available at least as early as Jul. 14, 2009.

Extended European Search Report for Application No. 20871214.1 dated Nov. 9, 2023 (10 pages).

* cited by examiner

DRAIN CLEANER CABLE DECOUPLER TOOL

CROSS REFERENCE TO RELATED APPLICATIONS

This application claims priority to U.S. Provisional Patent Application Ser. No. 62/909,876, filed on Oct. 3, 2019, the entire contents of which are incorporated by reference herein.

BACKGROUND OF THE INVENTION

The present invention relates to a cable decoupler tool, and specifically, to a cable decoupler tool for drain cleaner cables.

In drain and sewer cleaners, multiple cables may be secured together to a desired length. Additionally or alternatively, a drain cleaning tool may be coupled to an end of one of the cables. The cables and the drain cleaning tool can sometimes be difficult to separate for storage or for applications requiring a shorter cable or different accessory tool. Typically, pin keys have been used to separate the cables and drain cleaning tool, where a pin portion is inserted into a circular opening in the cable and used as a leverage point to pull the cables and/or drain cleaning tool apart.

SUMMARY

The present invention may provide, in one independent aspect, a cable decoupler tool configured to uncouple a drain cleaner cable coupling. The cable decoupler tool includes a mouth configured to receive a circumferential portion of a cable, a pin key extending from the mouth, and an actuator movable relative to the mouth to uncouple the drain cleaner cable coupling.

In another aspect, the mouth is defined by a first jaw and the actuator is a second jaw.

In another aspect, the actuator includes a cam lobe.

In a further aspect, the actuator is movable relative to the mouth about a pivot axis.

The present invention provides, in another independent aspect, a drain cleaner system including a cable, an accessory coupled to the cable to form a coupling, and a cable decoupler tool. The cable decoupler tool includes a mouth configured to receive a portion of the coupling and a pin key extending from the mouth. The pin key is configured to extend into the coupling to disengage the accessory from the cable. The cable decoupler tool also includes an actuator movable relative to the mouth to separate the cable from the accessory.

The present invention provides, in another independent aspect, a cable decoupler tool configured to uncouple a drain cleaner cable coupling. The cable decoupler tool includes a first handle having a first end, a second end opposite the first end, a first grip disposed at the first end, and a first jaw disposed at the second end. The cable decoupler tool also includes a second handle pivotably coupled to the first handle about a pivot axis. The second handle includes a third end, a fourth end opposite the third end, a second grip disposed at the third end, and a second jaw disposed at the fourth end. The first grip and the second grip are aligned in a plane that is perpendicular to the pivot axis.

Other independent features and independent aspects of the invention may become apparent by consideration of the following detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
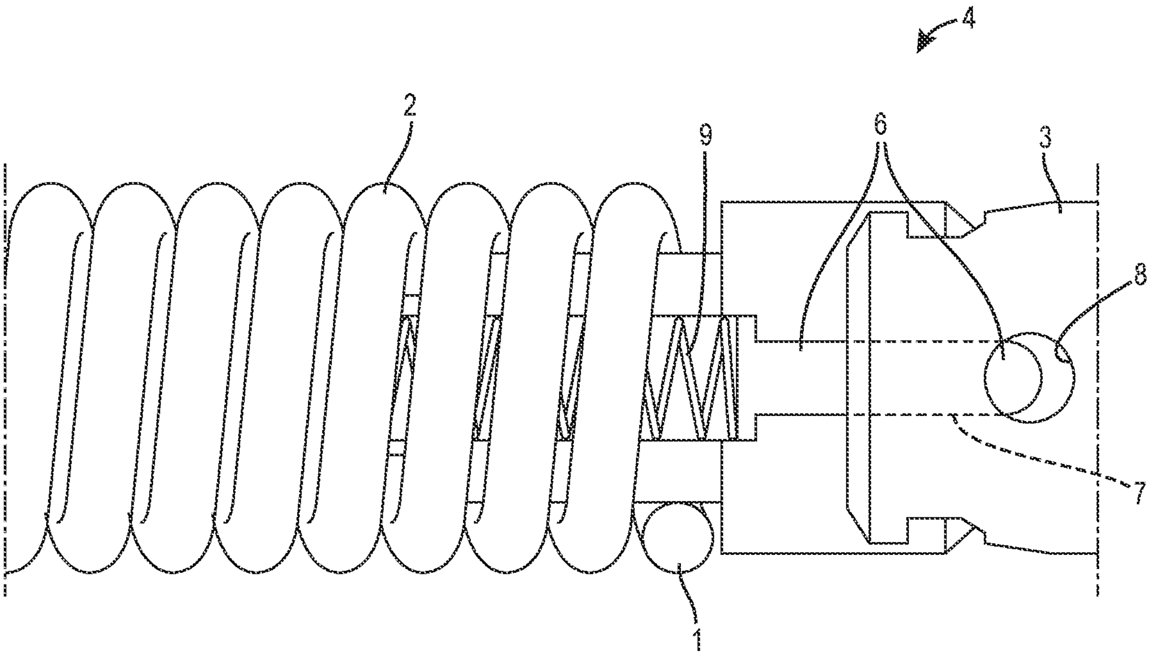
FIG. 1 is a plan view of a drain cleaning cable coupling.

Referring to FIG. 1, an end 1 of a drain cleaning cable 2 is typically connected to an accessory 3 (e.g., another cable or a drain cleaning tool) to aid in clearing a blockage within a drain line or pipe. Cutter tools, cables, and other accessories 3 are commonly connected to the drain cleaning cable 2 utilizing a coupling 4 having a plunger 6 that is fixed or otherwise secured at the end 1 of the cable 2. The plunger 6 is biased axially outward by a spring 9. The plunger 6 engages an opening 7 on the accessory 3 to engage the accessory 3 with the cable 2.

To separate the accessory 3 from the coupling 4 and the leading end 1 of the cable 2, a key pin is typically used. The key pin allows the user to insert an end of a cylindrical member into an access aperture 8 of the accessory 3. Such insertion compresses the spring 9 in the coupling 4 and shifts the plunger 6 away from the opening 7 in the accessory 3. After insertion of the key pin, the spring-actuated plunger 6 will disengage the accessory 3, allowing the accessory 3 to be removed from the cable 2. The user can then use force to slide the coupling 4 apart.

The example above is one of a plurality of different couplings used to couple a drain cleaner cable to a drain cleaning tool or another cable. In other embodiments, the drain cleaning cable coupling may include a fastener that may be positioned in the aperture 8 to secure two sections of cable together. Further, one section of cable may include a T-slot and the other section of cable may include a T-shaped flange that engages the T-slot to couple the cables together.

FIGS. 2-7 illustrate a drain cleaner cable decoupler tool 10 configured to decouple the coupling 4 described above. The decoupler tool 10 includes a first handle 14, a second handle 18, and an insert 22. The first handle 14 includes a first end 26 and a second end 30 opposite the first end 26. The first end 26 defines a grip portion 34 for a user to place a first hand on, and the second end defines a jaw 38. In the illustrated embodiment, the jaw 38 is integral with the grip portion 34. In other embodiments, the jaw 38 may be a separate piece that is coupled to the grip portion 34. The jaw 38 defines a receptacle 42.

The second handle 18 is pivtoably coupled to the first handle 14 about a pivot axis 46. In the illustrated embodiment, a pin or fastener 50 couples the first handle 14 to the second handle 18. In other embodiments, the first handle 14 may be coupled to the second handle 18 in other ways. The second handle 18 includes a first end 54 and a second end 58 opposite the first end 54. The first end 54 defines a grip portion 62 for a user to place a second hand on, and the second end 58 defines a cam lobe 66. In the illustrated embodiment, the cam lobe 66 is integral with the grip portion 62. In other embodiments, the cam lobe 66 may be a separate component that is coupled to the grip portion 62. The cam lobe 66 is oblong and includes a cable contact surface 70. In some embodiments, the cam lobe 66 may be referred to as an actuator that performs the decoupling of the coupling 4.

The insert 22 is positioned in the receptacle 42 of the first handle 14. The insert 22 may be one of a variety of sizes that correspond to a variety of cable diameters. As such, the insert 22 may be removable from the receptacle 42, and the receptacle 42 may be configured to receive a variety of different sized inserts. For example, the insert 22 may be sized to receive a drain cleaning cable that has a diameter that is 1¼", ⅞", or ⅝". In other embodiments, the insert 22 may be sized to receive a drain cleaning cable that has other diameters than listed above. In further embodiments, the decoupler tool 10 is part of a kit that includes several inserts 22 for several different sizes of cable. The insert 22 defines a mouth 74 that is generally circular. The mouth 74 includes a cable contact surface 78 (FIG. 1) that helps properly orient the coupling 4 when the coupling 4 is positioned in the insert 22. A pin key 82 (FIG. 1) extends from the mouth 74 and is configured to be inserted into the aperture 8 of the coupling 4. In the illustrated embodiment, the pin key 82 is an elongated cylindrical member. In other embodiments, the pin key 82 may have other suitable configurations for engaging different styles of couplings. The pin key 82 may be removably coupled to the insert 22 so that a user may vary the length of the pin key 82 or replace the pin key 82 if it is damaged.

Figure 2:
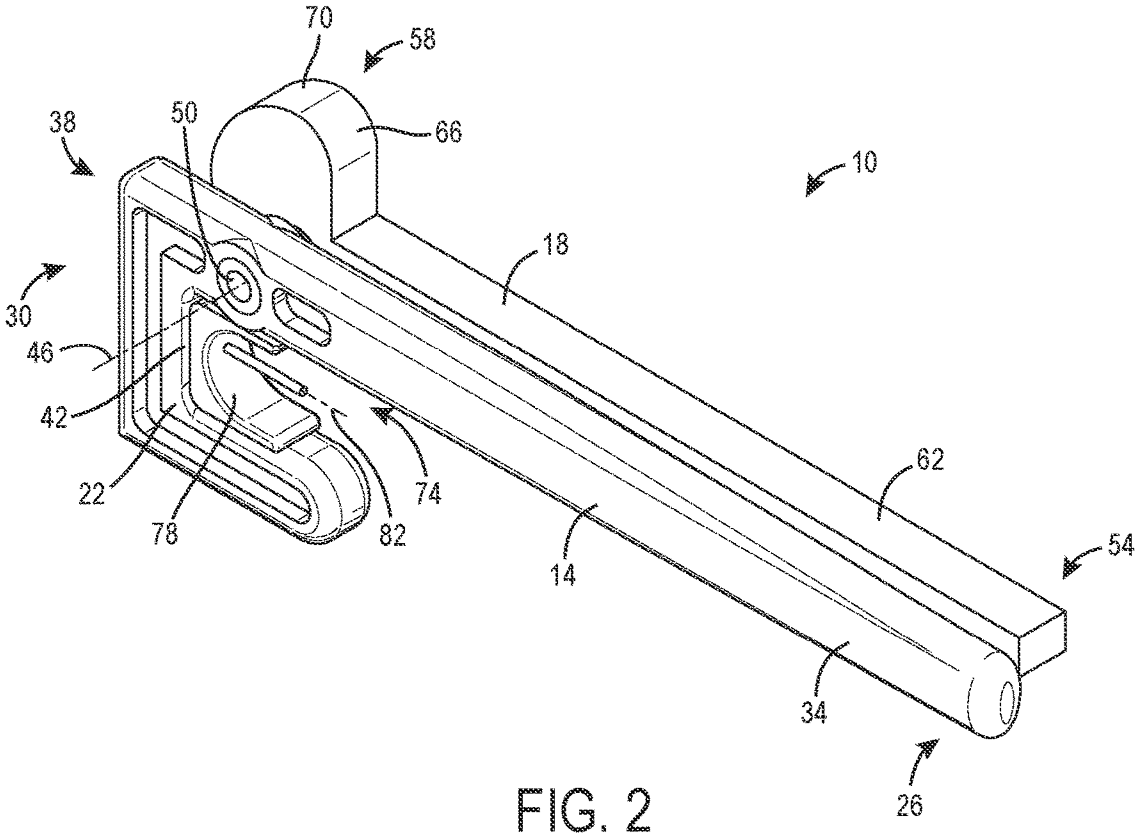
FIG. 2 is a perspective view of a drain cleaner cable decoupler tool in a first position.
Figure 3:
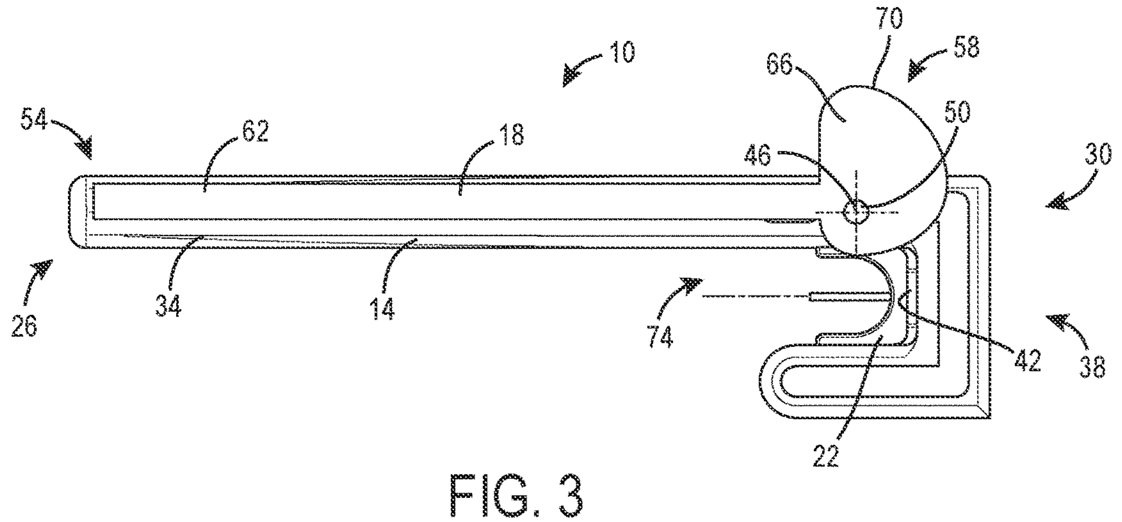
FIG. 3 is a side view of the drain cleaner cable decoupler tool of FIG. 2.
Figure 4:
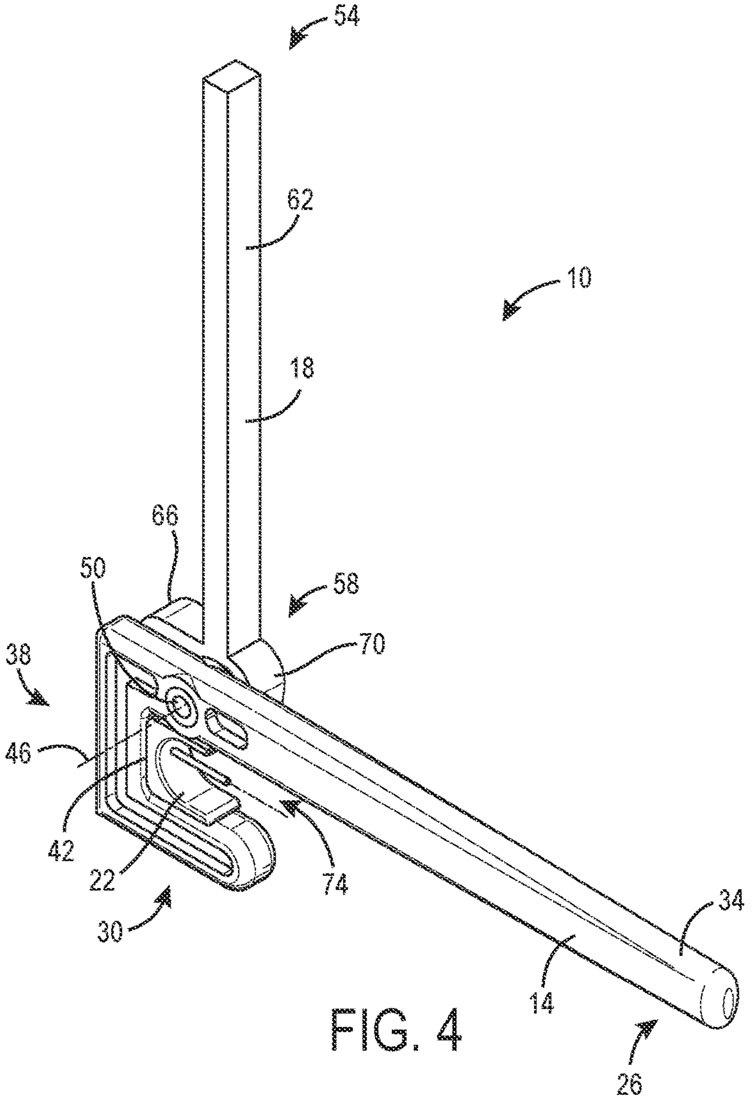
FIG. 4 is a perspective view of the drain cleaner cable decoupler tool of FIG. 2 in a second position.
Figure 5:
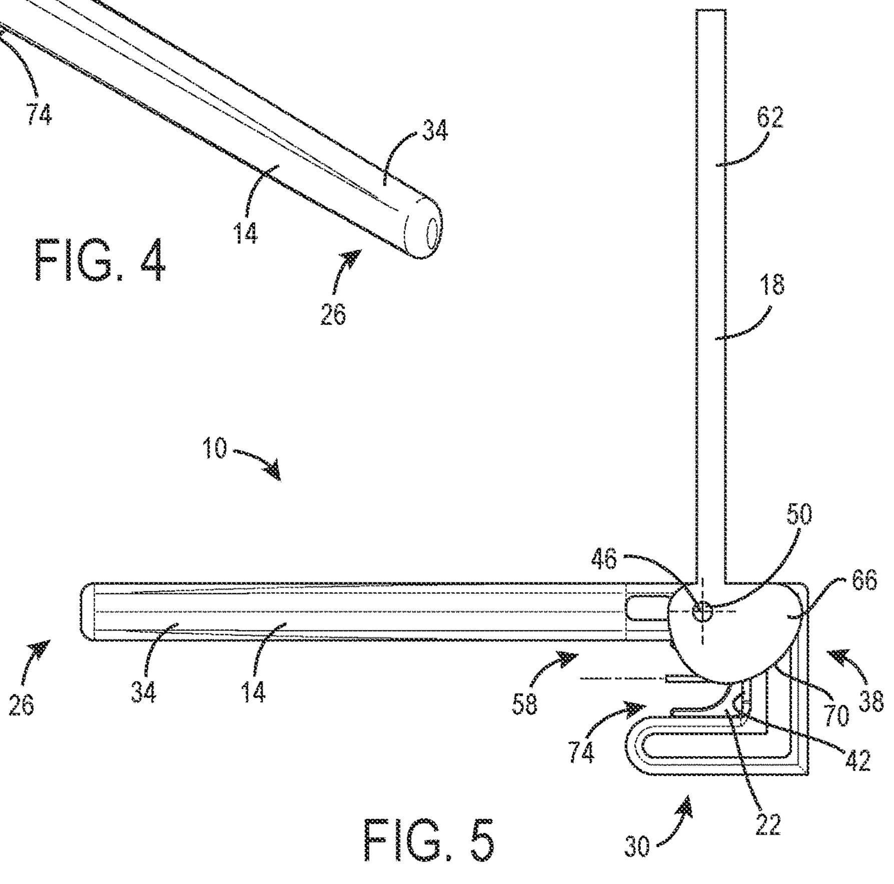
FIG. 5 is a side view of the drain cleaner cable decoupler tool of FIG. 4.
Figure 6:
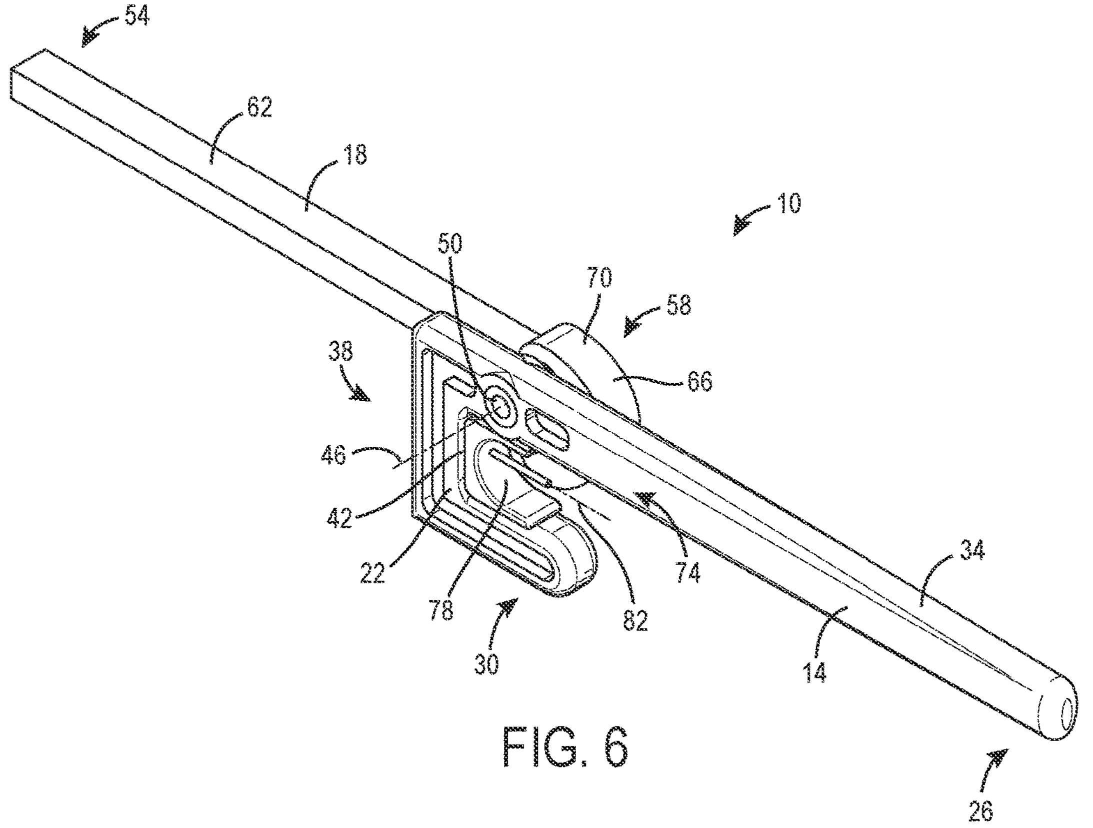
FIG. 6 is a perspective view of the drain cleaner cable decoupler tool of FIG. 2 in a third position.
Figure 7:
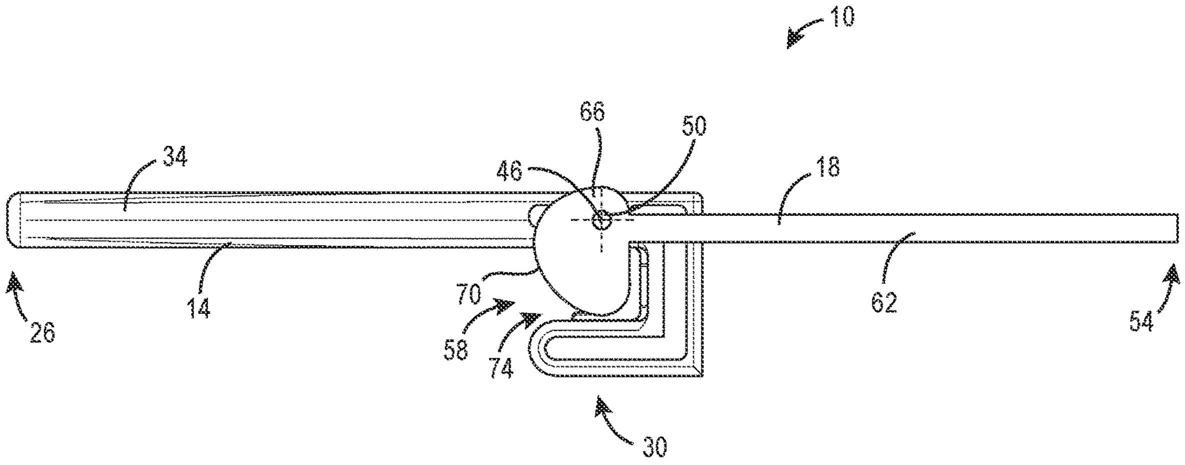
FIG. 7 is a side view of the drain cleaner cable decoupler tool of FIG. 6.

During operation of the decoupler tool 10, the decoupler tool 10 starts in an open position (FIGS. 2-3). A user places the coupling 4 into the mouth 74 of the insert 22 so that the pin key 82 is inserted into the aperture 8 and the cable 2 rests against the cable contact surface 78. The mouth 74 receives a circumferential portion of the cable 2. The pin key 82 allows the coupling 4 to be separated. A user may then place a first hand on the grip portion 34 of the first handle 14 and a second hand on the grip portion 62 of the second handle 18 and pivot the second handle 18 about the pivot axis 46 relative to the first handle 14 (e.g., clockwise as viewed in FIG. 5). As the user continues to pivot the second handle 18, the cable contact surface 70 of the cam lobe 66 engages the accessory 3. As shown in FIGS. 4 and 5, the cam lobe 66 provides a force to the coupling 4 that begins to separate the cable 2 from the accessory 3. Once the decoupler tool 10 reaches a closed position (FIGS. 6 and 7), the coupling 4 is completely separated, allowing a user to store the accessory 3. In the illustrated embodiment, the second handle 18 rotates 180 degrees relative to the first handle 14 from the open position to the closed position. In other embodiments, the second handle 18 may rotate more than or less than 180 degrees relative to the first handle 14 from the open position to the closed position.

Figure 8:
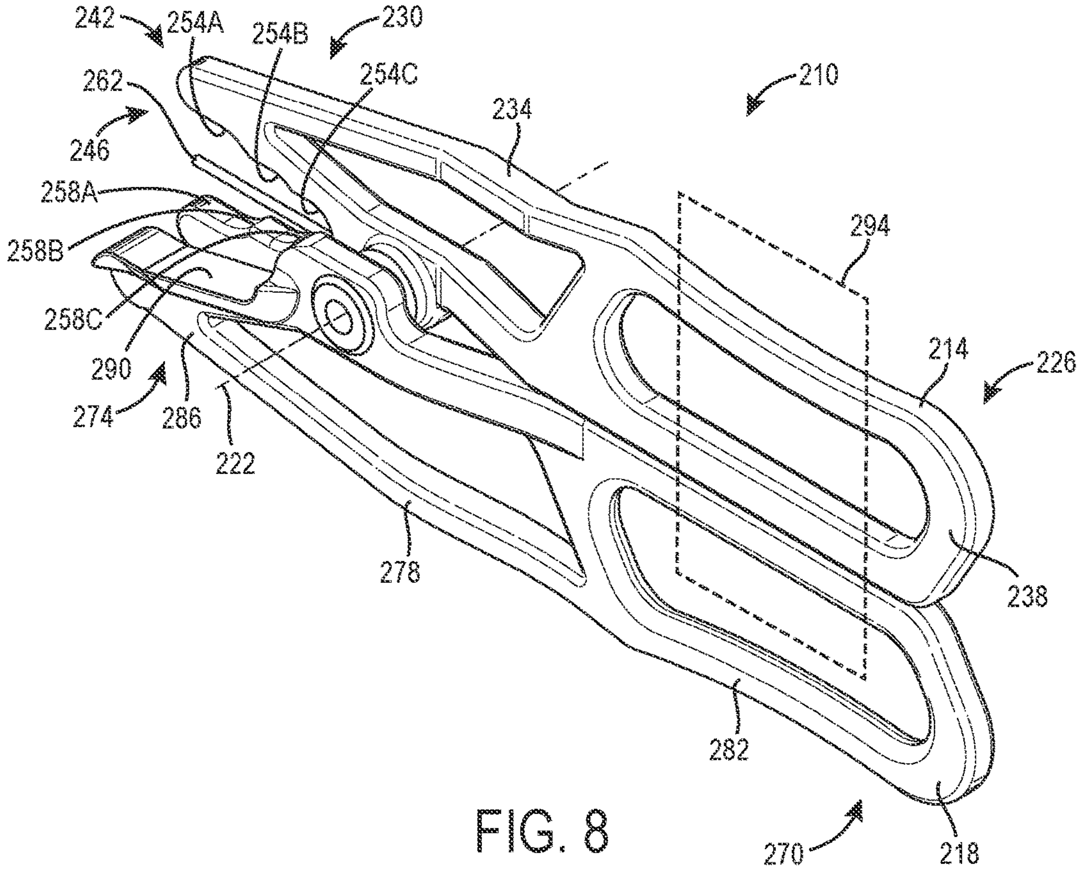
FIG. 8 is a perspective view of a drain cleaner cable decoupler tool according to another embodiment of the invention in a first position.
Figure 9:
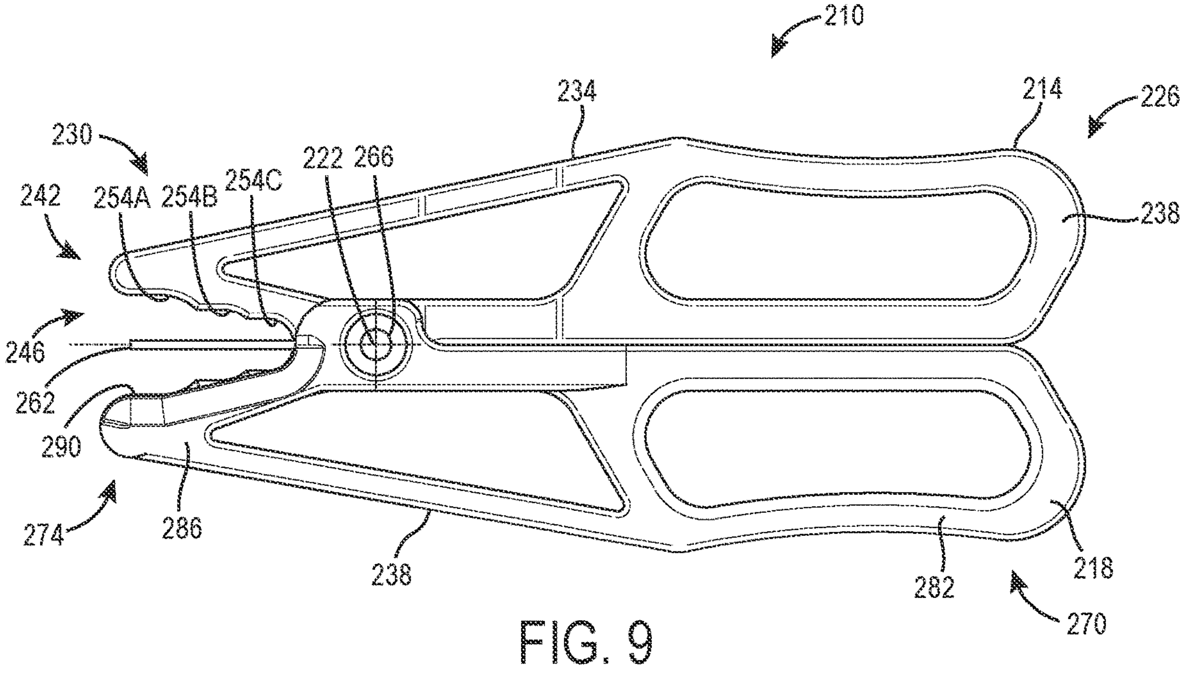
FIG. 9 is a side view of the drain cleaner cable decoupler tool of FIG. 8.

FIGS. 8-11 illustrate a decoupler tool 210 according to another embodiment of the invention. With reference to FIGS. 8 and 9, the decoupler tool 210 includes a first handle 214 and a second handle 218 pivotably coupled to the first handle 214 about a pivot axis 222. The first handle 214 includes a first end 226, a second end 230 opposite the first end 226, and a buttress 234 between the first and second ends 226, 230 to strengthen the decoupler tool 210. The first end 226 defines a grip portion 238 for a user to place a first hand on during operation of the decoupler tool 210. The second end 230 defines a first jaw 242 that includes a mouth 246 that the coupling 4 may be positioned within. The mouth 246 is defined by three connected recesses that correspond to various sizes of cables. For example, a first recess 254A may be sized to fit around a circumferential portion of a ⅝" cable, a second recess 254B may be sized to fit around a circumferential portion of a ⅞" cable, and a third recess 254C may be sized to fit around a circumferential portion of a 1¼" cable. In other embodiments, the recesses 254A-C may be sized to fit other diameters of cable. Each of the recesses 254A-C is defined by a cable contact surface 258A-C that engages the cable 2 to assist in positioning it for decoupling. A cylindrical pin key 262 extends from the mouth 246 in a direction that is perpendicular to the pivot axis 222. In the illustrated embodiments, the pin key 262 extends the full length of the mouth 246. In other embodiments, the pin key 262 may extend less than or more than the full length of the mouth 246. For example, the pin key 262 may be replaced with pin keys of different lengths that may better fit certain types of couplings.

The second handle 218 is pivotably coupled to the first handle 214 with a pin or fastener 266. In some embodiments, the second handle 218 may be considered an actuator. The second handle 218 includes a first end 270, a second end 274 opposite the first end 270, and a buttress 278 between the first and second ends 270, 274 to strengthen the decoupler tool 210. The first end 270 defines a grip portion 282 for a user to place a hand. The second end 274 defines a second jaw 286. The second jaw 286 is an open jaw. In other words, the second jaw 286 is half of a full jaw. The second jaw 286 includes a cable contact surface 290 that engages the coupling 4 to separate the coupling 4. In some embodiments, the second jaw 286 may include a reinforced layer to assist in the separation of the coupling 4.

Figure 10:
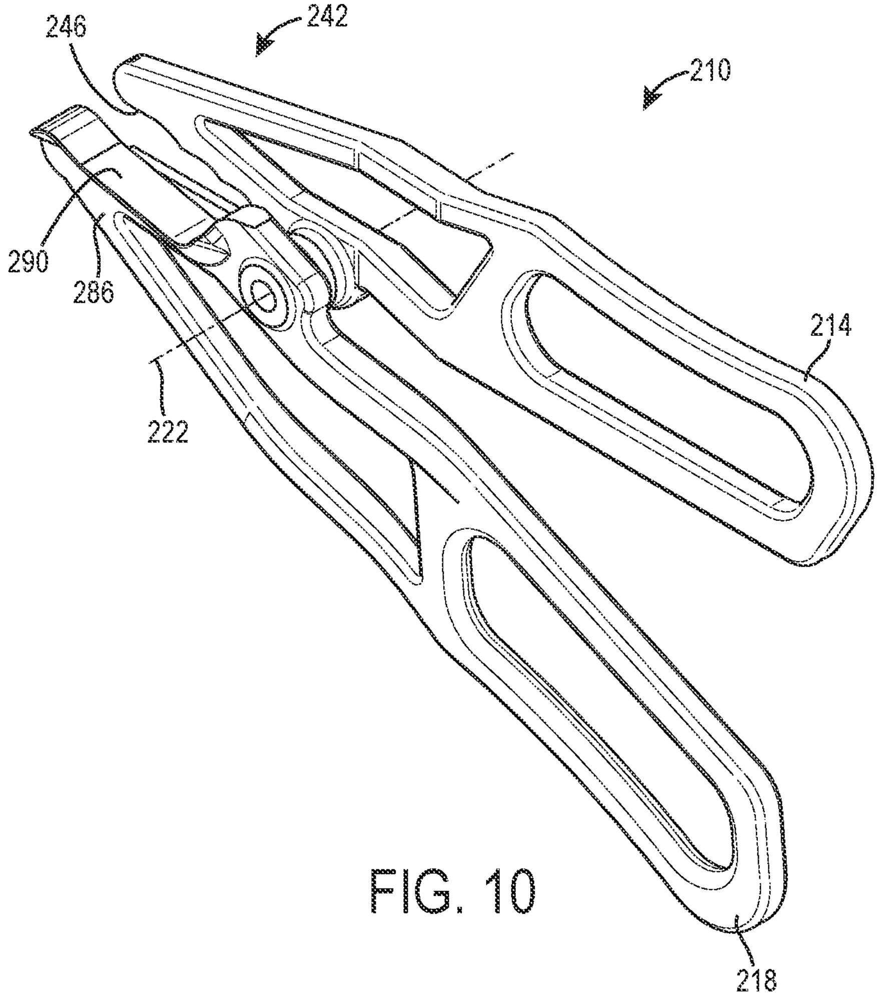
FIG. 10 is a perspective view of the drain cleaner cable decoupler tool of FIG. 8 in a second position.
Figure 11:
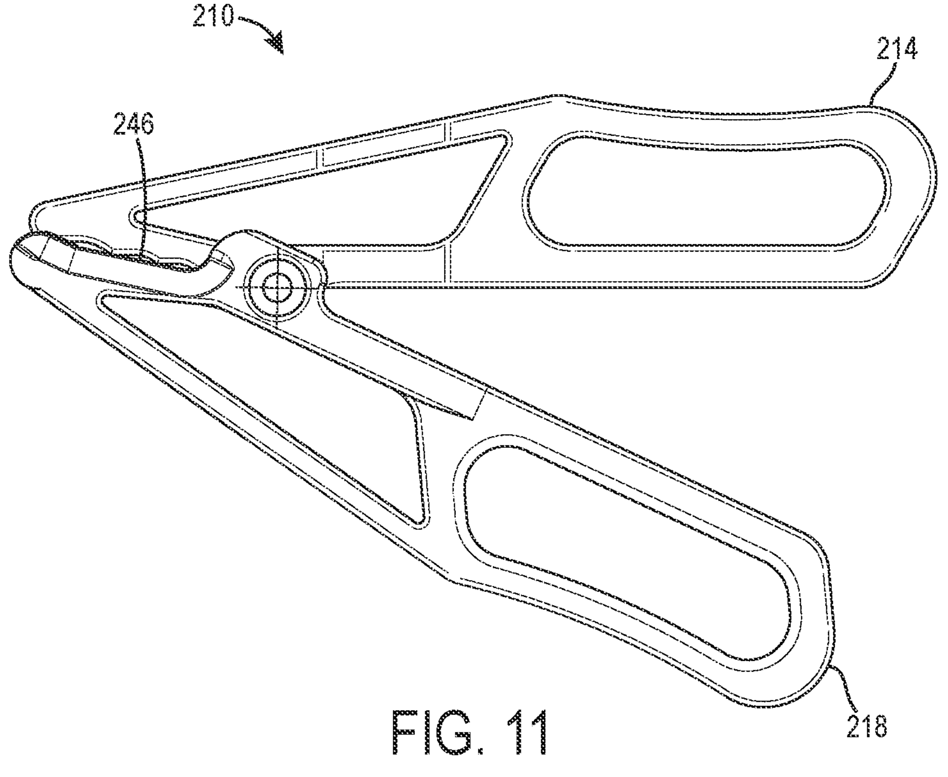
FIG. 11 is a side view of the drain cleaner cable decoupler tool of FIG. 10.

FIGS. 8 and 9 illustrate the decoupler tool 210 in an open position. While in the open position, a user may position the coupling 4 within the mouth 246 of the first jaw 242 with the pin key 262 entering the aperture 8. Depending on the size of the cable, the coupling 4 will be received in one of the recesses 254A-C. The cable contact surface 258A-C of the recess 254A-C and the pin key 262 fix the cable 2 of the coupling 4 in position relative to the accessory 3. A user may then engage the grip portions 238, 282 of the first and second handles 214, 218. The grip portion 238 of the first handle 214 and the grip portion 282 of the second handle 218 are aligned in a plane 294 and move within the plane 294. As such, the decoupler tool 210 may be operated with a single hand similar to scissors. Although, if extra force is required a user may place a first hand in the grip portion 238 of the first handle 214 and a second hand in the grip portion 282 of the second handle 218. Once the grip of the user is established, the user may move the second handle 218 away from the first handle 214 (e.g., clockwise as viewed in FIG. 9) to a closed position (FIGS. 10 and 11). As the second handle 218 is pivoted from the open position to the closed position, the cable contact surface 290 of the second jaw 286 engages the accessory 3 to provide a separating force that separates the cable 2 from the accessory 3.

FIGS. 12-15 illustrate a decoupler tool 310 according to another embodiment of the invention. The decoupler tool 310 is similar to the decoupler tool 210 with like features being represented with like reference numbers plus 100. However, instead of separating the first and second handles 214, 218 apart from each other to provide a separating force like the decoupler tool 210, the handles 314, 318 of the decoupler tool 310 are squeezed together to provide a separating force as described below.

Figure 12:
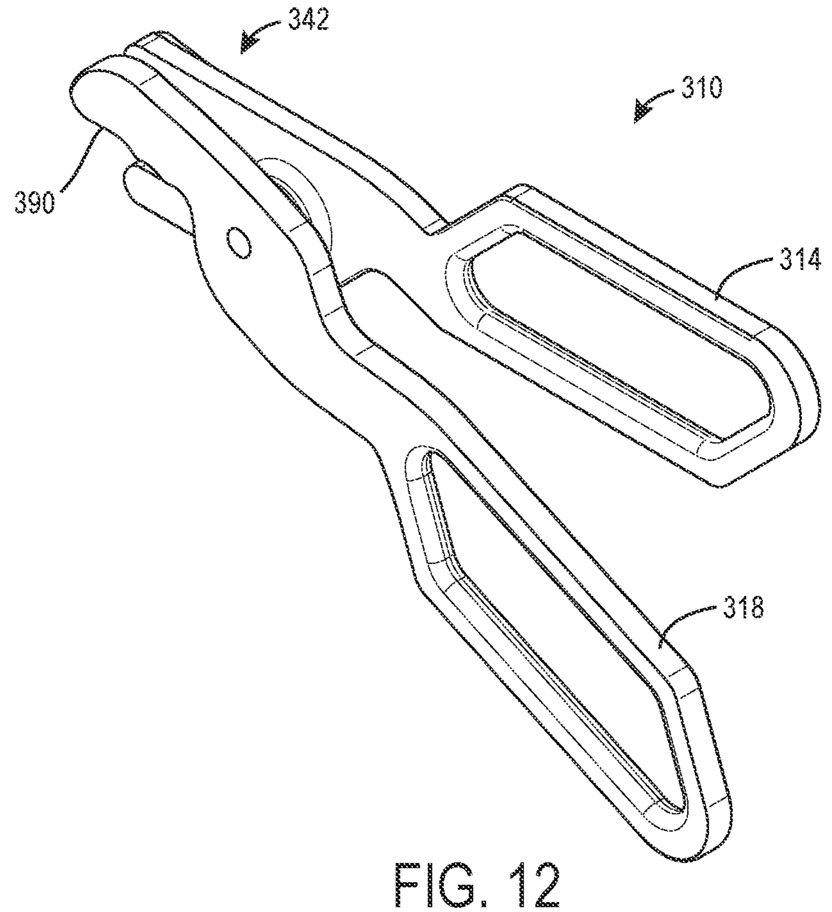
FIG. 12 is a perspective view of a drain cleaner cable decoupler tool according to another embodiment of the invention in a first position.
Figure 13:
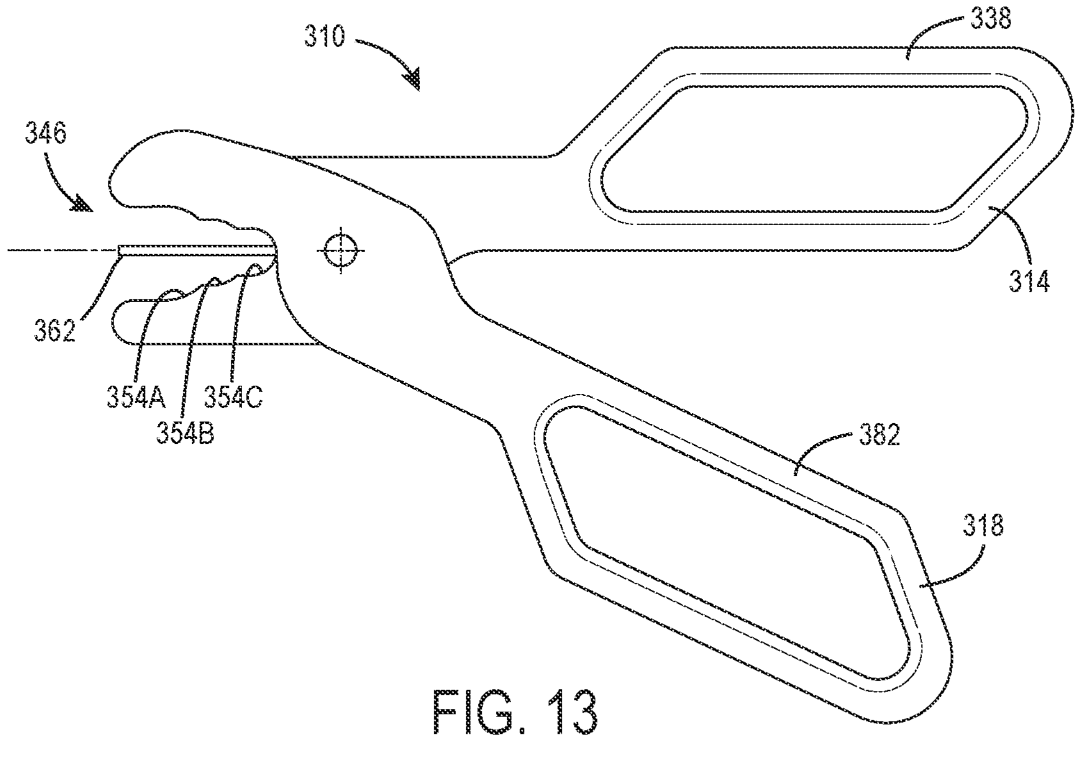
FIG. 13 is a side view of the drain cleaner cable decoupler tool of FIG. 12.
Figure 14:
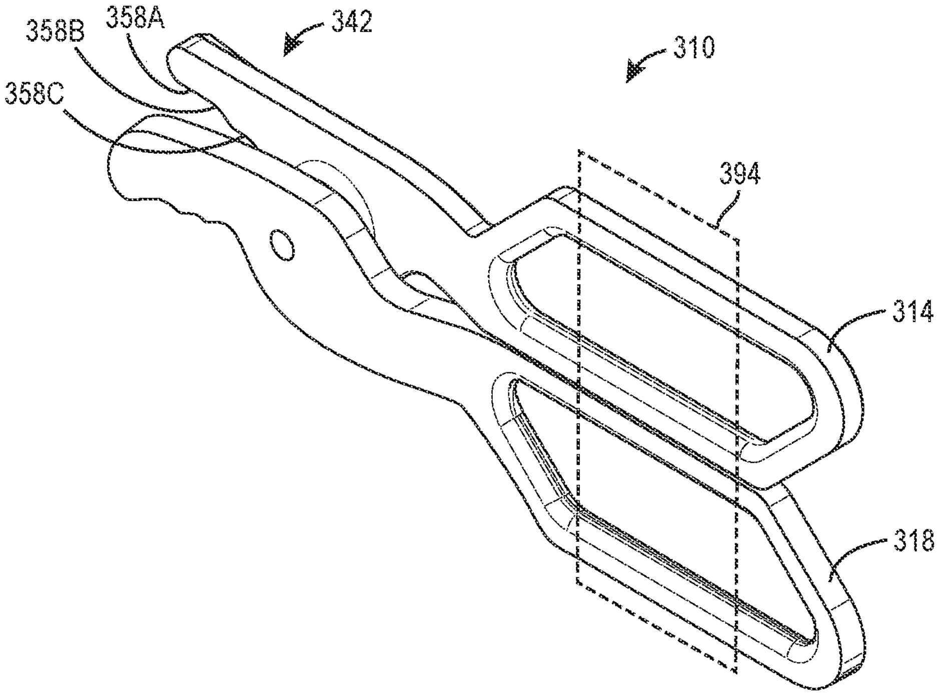
FIG. 14 is a perspective view of the drain cleaner cable decoupler tool of FIG. 12 in a second position.
Figure 15:
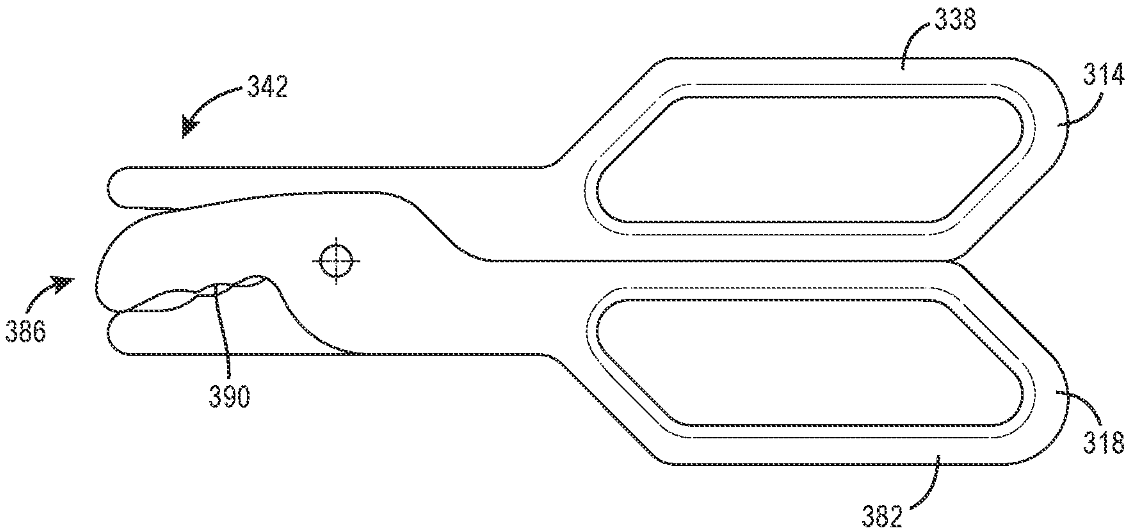
FIG. 15 is a side view of the drain cleaner cable decoupler tool of FIG. 14.

During operation of the decoupler tool 310, a user first separates the first and second handles 314, 318 apart to an open position as shown in FIGS. 12 and 13. Once the handles 314, 318 are separated, a user may position the coupling 4 within the mouth 346 of the first jaw 342 with the pin key 362 entering the aperture 8. Depending on the size of the cable, the coupling 4 will engage one of the slots 354A-C. The cable contact surface 358A-C of the slot 354A-C and the pin key 362 fix the cable 2 of the coupling 4 in position relative to the accessory 3. A user may then engage the grip portions 338, 382 of the first and second handles 314, 318. The grip portion 338 of the first handle 314 and the grip portion 382 of the second handle 318 are aligned in a plane 394 and move within the plane 394. As such, the decoupler tool 310 may be operated with a single hand similar to scissors. Although, if extra force is required a user may place a first hand in the grip portion 338 of the first handle 314 and a second hand in the grip portion 382 of the second handle 318. Once the grip of the user is established, the user may move the second handle 318 toward the first handle 314 (e.g., counter-clockwise as viewed in FIG. 15) to a closed position (FIGS. 14 and 15). As the second handle 318 is pivoted from the open position to the closed position, the cable contact surface 390 of the second jaw 386 comes in contact with the accessory 3 to apply a clamping force. The clamping force applied by the second jaw 386 separates the cable 2 from the accessory 3.

Figure 17:
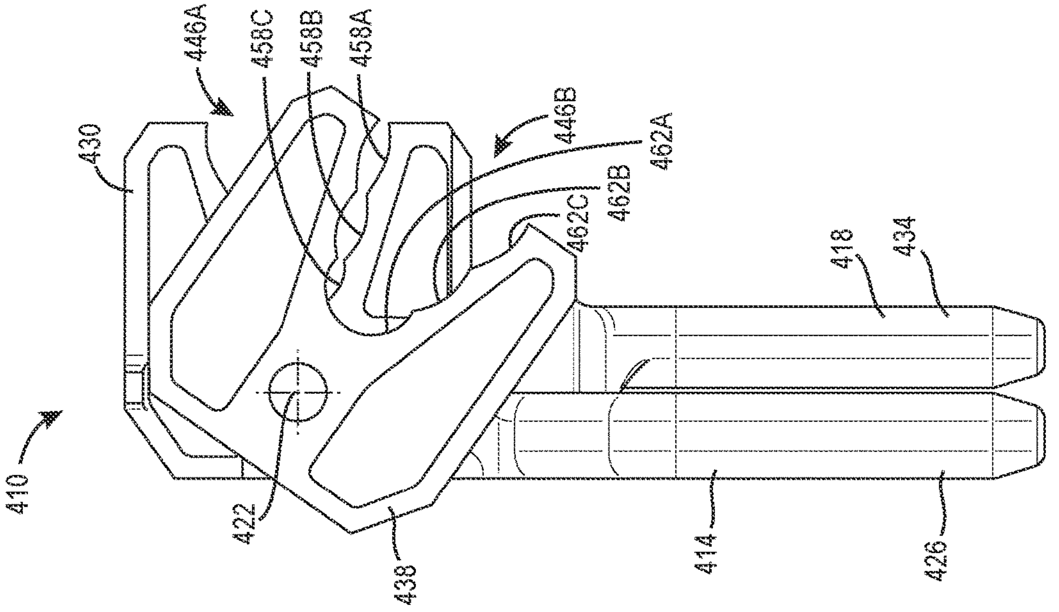
FIG. 17 is side view of the drain cleaner cable decoupler tool of FIG. 16 in a second position.
Figure 16:
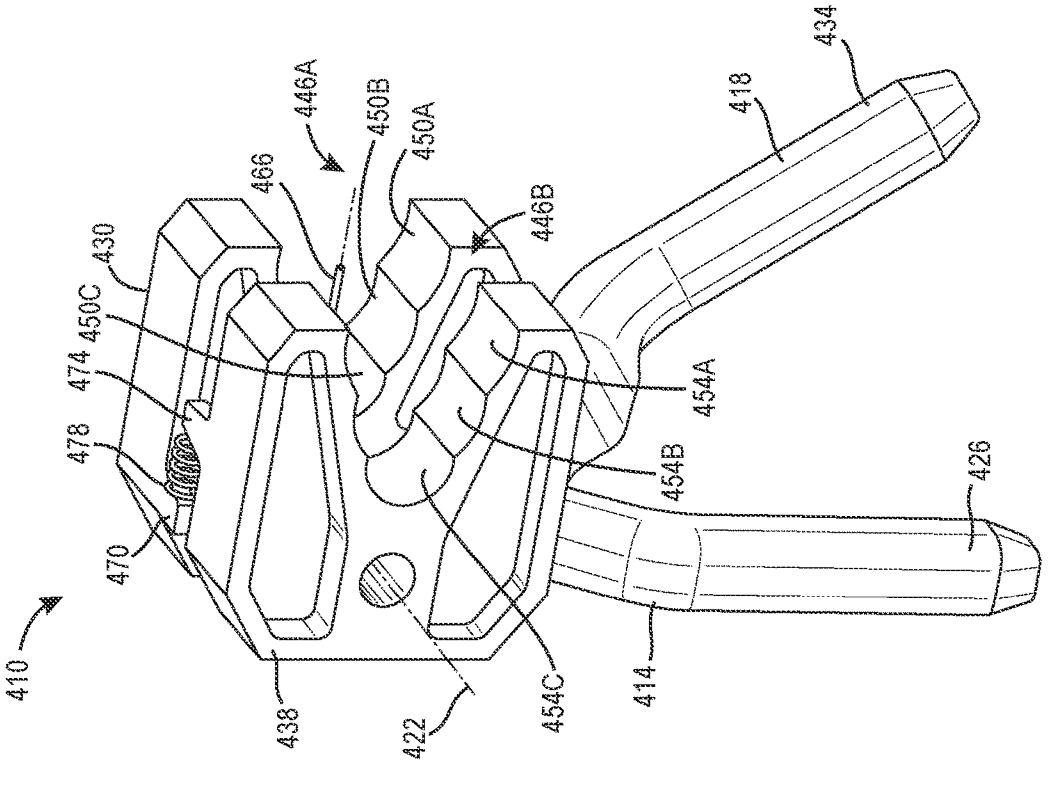
FIG. 16 is a perspective view of a drain cleaner cable decoupler tool according to another embodiment of the invention in a first position.

FIGS. 16 and 17 illustrate a decoupler tool 410 according to another embodiment of the invention. The decoupler tool 410 includes a first handle 414 and a second handle 418 pivotably coupled to the first handle 414 about a pivot axis 422. A pin or fastener may be used to pivotably couple the first handle 414 to the second handle 418. The first handle 414 includes a grip portion 426 and a first jaw 430 extending from the grip portion 426. The second handle 418 also includes a grip portion 434 and a second jaw 438 extending from the grip portion 434. In some embodiments, the second jaw 438 may be considered an actuator. The grip portions 426, 434 of the first and second handles 414, 418 are aligned in a plane that is perpendicular with the pivot axis 422. Both the first and second jaws 430, 438 include a mouth 446A, 446B, respectively, defined by connected recesses 450A-C, 454A-C, similar to the recesses 254A-C described above with respect the decoupler tool 210. As such, the recesses 450A-C, 454A-C are sized to engage cables of different sizes (e.g., ⅝", ⅞", 1¼"). The recesses 450A-C, 454A-C each define cable contact surfaces 458A-C, 462A-C that engage a circumferential portion of the coupling 4. A pin key 466 extends from the first jaw 430 in a direction perpendicular to the pivot axis 422. In other embodiments, the pin key 466 may extend from the second jaw 438.

As shown in FIG. 16, the decoupler tool 410 is in an open position, in which, the coupling 4 may be inserted into the mouths 446A, 446B of the first and second jaws 430, 438 having the pin key 466 extend into the aperture 8. The cable 2 engages one of the slots 450A-C on the mouth 446A of the first jaw 430 to secure the coupling 4 in place while the pin key 466 fixes the cable 2 relative to the accessory 3. With the coupling 4 secured, a user may then grasp the grip portions 426, 434 of the first and second handles 414, 418. Since the first and second handles 414, 418 are aligned on the plane, a user may use a single hand to grasp both handles 414, 418. Although, if more force is required a user may use two hands. A user may then clamp the handles 414, 418 drawing the grip portion 434 of the second handle 418 towards the grip portion 426 of the first handle 414 (e.g., clockwise as viewed in FIG. 16) to a closed position (FIG. 17). As the grip portion 426 of the first handle 414 approaches the grip portion 434 of the second handle 418, the second jaw 438 of the second handle 418 engages the accessory 3 to apply a clamping force. The clamping force applied by second jaw 438 separates the cable 2 from the accessory 3.

In the illustrated embodiment, the first jaw 430 includes a first tab 470 and the second jaw 438 includes a second tab 474. A resilient member 478 coupled to the first and second tabs 470, 474 may bias the decoupler tool 410 to the open position. In some embodiments, the resilient member 478 may be a spring (e.g., coil spring, torsion spring, or the like).

Figure 18:
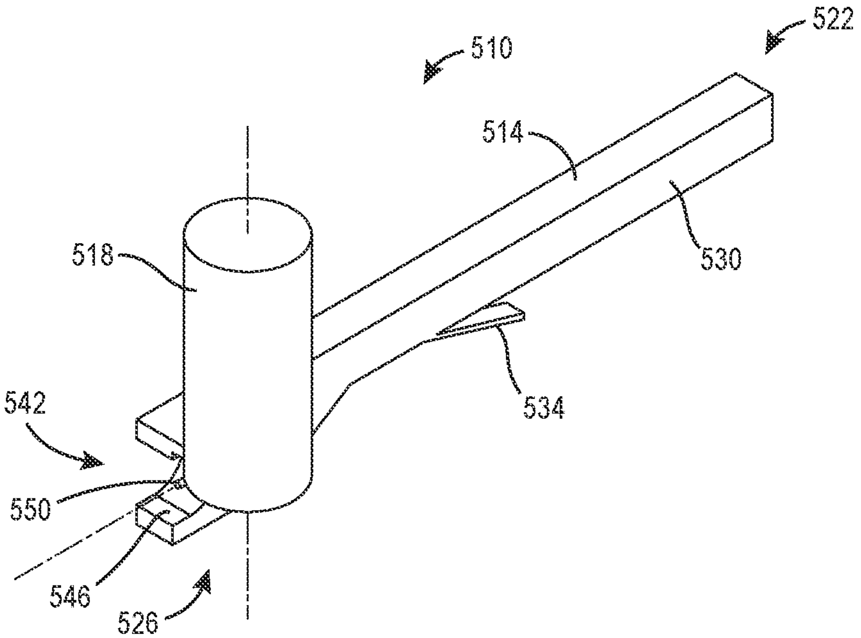
FIG. 18 is a perspective view of a drain cleaner cable decoupler tool according to another embodiment of the invention.
Figure 19:
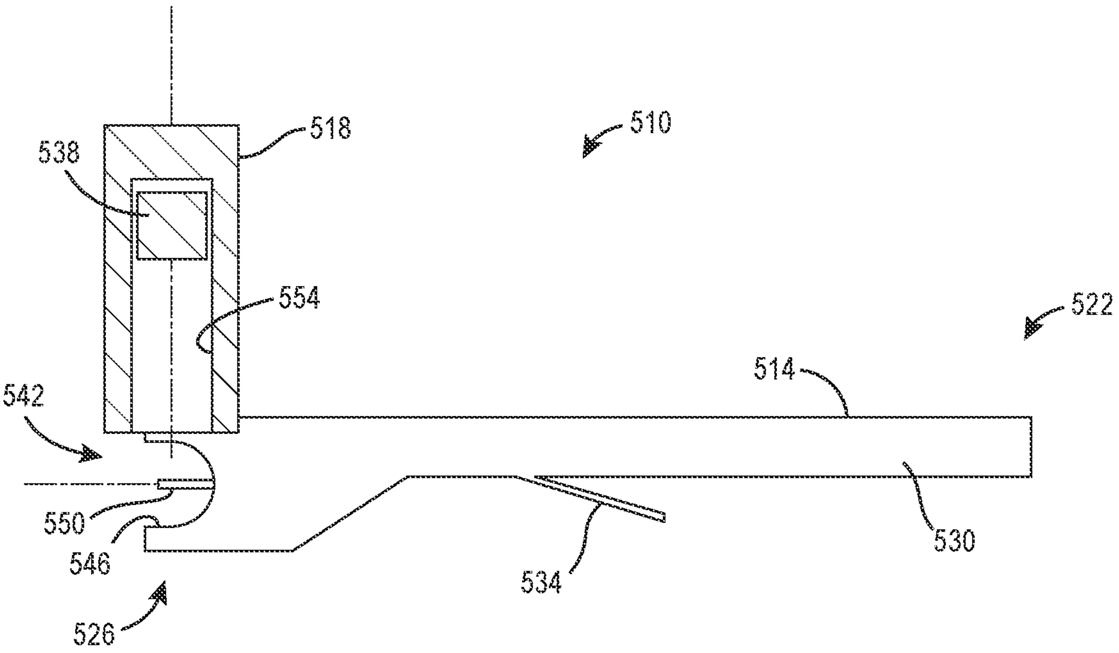
FIG. 19 is a cross-sectional view of the drain cleaner cable decoupler tool of FIG. 18.

FIGS. 18 and 19 illustrate a decoupler tool 510 according to another embodiment of the invention. The decoupler tool 510 includes a handle 514 and an actuator 518 coupled to the handle 514. The handle 514 includes a first end 522 and a second end 526 opposite the first end 522. The first end 522 defines a grip portion 530 for a user to hold during operation of the decoupler tool 510. The grip portion 530 includes a trigger 534 operable to actuate the actuator 518. The second end 526 of the handle 514 includes a mouth 542 with a cable contact surface 546 that receives the coupling 4. A pin key 550 extends from the mouth 524 in a direction parallel to a longitudinal axis of the handle 514.

The actuator 518 is generally cylindrical and supported by the handle 514 adjacent the mouth 542. The actuator 518 defines an interior 554 and includes a driving element 538 positioned within the interior 554. The driving element 538 is supported above the mouth 542 as viewed in FIG. 19. An energy storage device to store potential energy is also positioned within the interior 554 of the actuator 518. The energy storage device supports the driving element 538 within the actuator 518 and converts the potential energy to kinetic energy to move the actuator 538 within the interior 554. The energy storage device is coupled to the trigger 534 so that activation of the trigger 534 releases the potential energy of the energy storage device and moves the actuator 538. In some embodiments, the energy storage device may be a compression spring or other resilient member. In other embodiments, the energy storage device may be pneumatic. In further embodiments, the energy storage device may be a solenoid or other type of electrical actuator.

During operation of the decoupler tool 510, a user may position the coupling 4 in the mouth 542 of the handle 514 with the pin key 550 extending into the aperture 8 of the coupling 4. The cable contact surface 546 secures the coupling 4 in place and the pin key 550 fixes the cable 2 relative to the decoupler tool 510. When in the correct position, the accessory 3 will be positioned under the actuator 518. A user may then actuate the trigger 534 to activate the energy storage device. The energy storage device will turn the potential energy to kinetic energy and move the driving element 538 towards the mouth 542. The driving element 538 will contact the accessory 3 and transfer the kinetic energy providing a force that will separate the coupling 4. The energy storage device and the driving element 538 may then be returned to its potential energy state at the top of the interior 554 of the actuator 518.

Although the invention is described with reference to discrete embodiments of a decoupler tool, variations of the decoupler tool exist within the spirit and scope of the invention.

Various features and advantages of the invention are set forth in the following claims.

What is claimed is:

1. A cable decoupler tool configured to uncouple a drain cleaner cable coupling, the cable decoupler tool comprising:
- a first handle including a first jaw, the first jaw defining a first mouth configured to receive a circumferential portion of a cable;
- a pin key extending from the first mouth, the pin key being an elongated cylindrical member; and
- a second handle including a second jaw, the second jaw defining a second mouth, the second handle being an actuator movable relative to the first handle to uncouple the drain cleaner cable coupling.

2. The cable decoupler tool of claim 1, wherein the second jaw is an open jaw.

3. The cable decoupler tool of claim 1, wherein the actuator includes a cam lobe.

4. The cable decoupler tool of claim 1, wherein the actuator is movable relative to the first mouth about a pivot axis.

5. The cable decoupler tool of claim 4, wherein the pin key extends from the mouth in a direction that is perpendicular to the pivot axis.

6. The cable decoupler tool of claim 1, further comprising a handle including a jaw, and wherein the mouth is defined on an insert that is removably coupled to the jaw.

7. The cable decoupler tool of claim 1, wherein the first mouth includes a plurality of recesses that are sized to receive cables of different sizes.

8. The cable decoupler tool of claim 1, wherein the actuator includes an energy storage device and a driving element positioned above the mouth.

9. A drain cleaner system comprising:
- a cable;
- an accessory coupled to the cable to form a coupling; and
- a cable decoupler tool including,
- a first handle including a first jaw, the first jaw defining a first mouth configured to receive a portion of the coupling,
- a pin key extending from the mouth, the pin key being an elongated cylindrical member, the pin key configured to extend into the coupling to disengage the accessory from the cable, and
  - a second handle including a second jaw, the second jaw defining a second mouth, the second handle being an actuator movable relative to the first handle to separate the cable from the accessory.

10. The drain cleaner system of claim 9, wherein the second handle that is pivotably coupled to the first handle, wherein the first and second handles are aligned in the same plane.

11. The drain cleaner system of claim 10, wherein the first and second handles move towards each other within the plane to uncouple the coupling and separate the cable from the accessory.

12. The drain cleaner system of claim 10, wherein the first and second handles move away from each other within the plane to uncouple the coupling and separate the cable from the accessory.

13. A cable decoupler tool configured to uncouple a drain cleaner cable coupling, the cable decoupler tool comprising:
- a first handle including a first end, a second end opposite the first end, a first grip disposed at the first end, and a first jaw disposed at the second end, the first jaw defining a first V-shaped opening;
- an elongated cylindrical member extending from the first V-shaped opening;
  - a second handle pivotably coupled to the first handle about a pivot axis, the second handle including a third end, a fourth end opposite the third end, a second grip disposed at the third end, and a second jaw disposed at the fourth end, the second jaw defining a second V-shaped opening;
  - wherein the first grip and the second grip are aligned in a plane that is perpendicular to the pivot axis; and
  - wherein the first jaw and the second jaw are aligned in a first position to receive the drain cleaner cable coupling, and wherein the first jaw and the second jaw are misaligned in a second position to decouple the drain cleaner cable coupling.

14. The cable decoupler tool of claim 13, wherein the first V-shaped opening is configured to receive a portion of a cable, and wherein the second V-shaped opening is configured to receive a portion of the cable.

15. The cable decoupler tool of claim 14, wherein the first V-shaped opening includes a plurality of recesses sized to engage cables of different sizes.

16. The cable decoupler tool of claim 13, wherein the first and second handles are moveable between an open position, in which, the first and second jaws are configured to receive the drain cleaner cable coupling, and a closed position, in which, the jaws apply a clamping force to the drain cleaner cable coupling to separate the drain cleaner cable coupling.

* * * * *